Patented Aug. 11, 1936

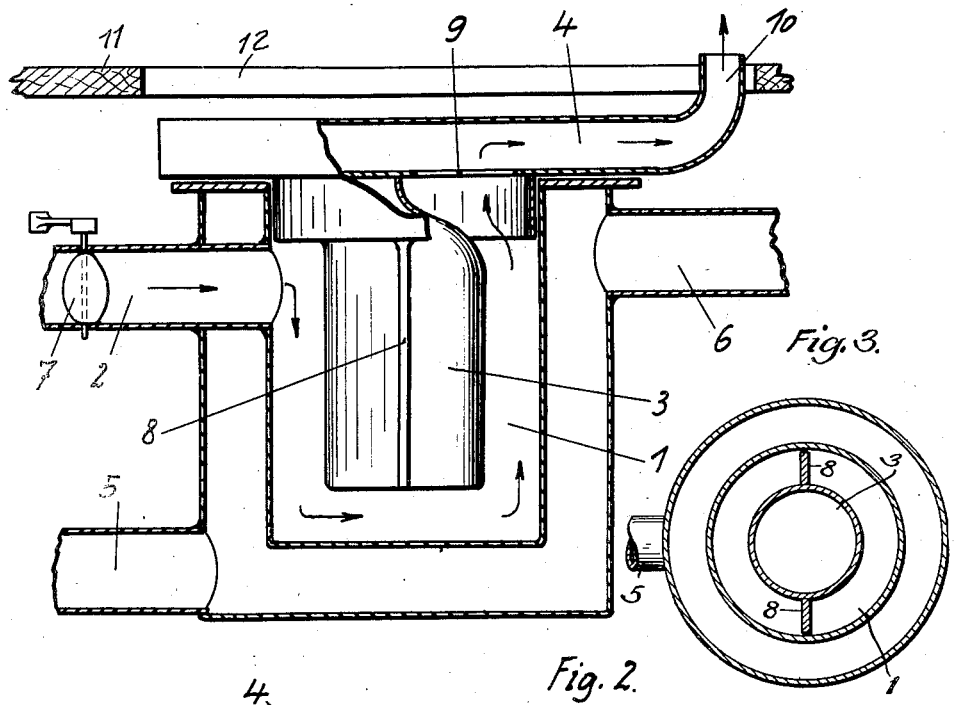
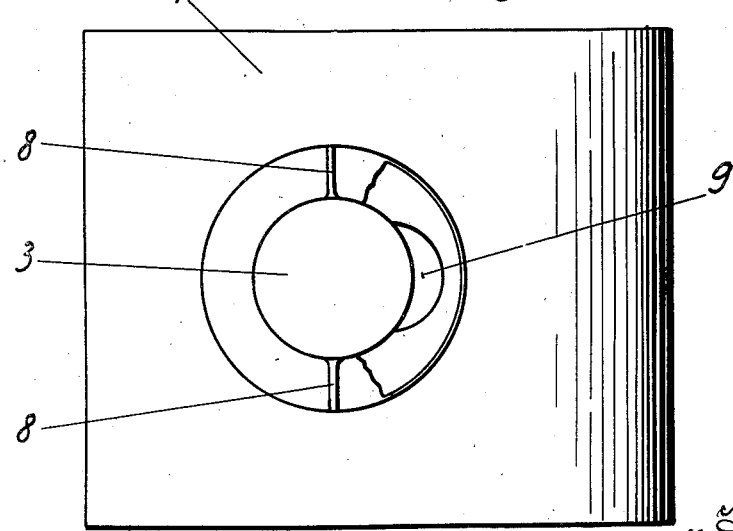

2,050,281

UNITED STATES PATENT OFFICE 2,050,281

HEATING DEVICE FOR AUTOMOBILES

Gabriele Dietrich, Meinersdorf, Germany

Application April 18, 1935, Serial No. 17,127
In Germany September 15, 1934

3 Claims. (Cl. 237—12.3)

Application has been filed in Germany, September 15, 1934.

This invention relates to a device operated by the exhaust gases of motor vehicles or the like for heating the inside of the vehicle.

Various types of devices operated by exhaust gases of motor vehicles for heating the interior of vehicles are known, and the improvement proposed by the invention consists in employing a heating device operated by exhaust gases for heating the inside of the vehicle without using the exhaust gases directly as a heating medium, but by using fresh air which is heated by means of the exhaust gases.

The feature of the invention is that the heating device is formed of a double-walled container, having a damper which serves to open or close a fresh air supply pipe through which fresh air is admitted from the exterior into the double-walled container. The object of the invention is that a portion of the device for heating the vehicle is made removable so that it may be replaced by a means that can be used for cooking foodstuffs by fresh air entering through the fresh air supply pipe and heated by means of the exhaust-gases from the motor vehicle.

When it is desired to heat the interior of the vehicle, the parts shown in the drawing in Fig. 1, namely 3 and 4 remain. When it is desired to cook foodstuffs, the parts 3 and 4 are removed and instead of these any cooking utensil containing the food to be cooked is inserted.

The present invention is illustrated in the accompanying drawing, in which

Figure 1 is a side view of a heating device shown partially in section for heating fresh air, by means of exhaust gases.

Figure 2 shows a bottom view of the heating device.

Figure 3 is a horizontal section through the device.

Referring to the drawing, the heating device 1 comprises a double-walled container, into which the necessary cooking utensil is inserted, if the device is to be used for heating or cooking foodstuffs and the like (the parts 3 and 4 having previously been removed).

The cooking utensil should be of such construction that the same will fit and contact with all sides of the inner wall of the heating device 1.

The double-walled container may be supported in any suitable manner, as may be required from the bottom of the flooring 11, of the vehicle.

Into the hollow space under the double-walls of the heating device 1, exhaust gases from the motor vehicle are introduced through pipe 5, which travel around and under the heating device 1 and which are discharged through the pipe 6.

A fresh air supply pipe 2 having a damper 7 therein serves to open or close the fresh air supply pipe 2, and serves to control the fresh air entering therein.

From the drawing as shown by arrows in Figure 1, it will be seen how the fresh air travels, entering through the supply pipe 2 traveling inside of the device 1 around the container 3 and then escaping upwardly through a chamber and to the funnel 10 which discharges into the body of the vehicle.

It will be noted that the fresh air traveling as above indicated, travels immediately above the pipes 5 and 6 through which the hot exhaust gases from the motor vehicle travel, and that thus the fresh air will be heated by said exhaust gases. The hot air will then be used either for cooking foodstuffs, or may be used to heat the interior of the vehicle.

To insure satisfactory heating of the fresh air a member 3 attached to chamber 4 inserted through an opening 12 in the floor 11 of the vehicle is inserted into the heating device 1, which is open on the top. The member 3 is constructed in such a manner that the same partly fills the inner space of the heating device 1, and thus drives the fresh air introduced through the supply pipe 2 against the inner wall of the device 1.

For the same reason, the member 3 is further constructed so that it divides the inner space of the device 1 into two chambers except for a small passage located below, in the construction shown.

For this purpose the member 3 is provided with the ribs 8 which extend parallel in longitudinal direction with the inner wall of the container 1.

To shut off the heating device 1 at the top to permit the passage of the heated fresh air to circulate and enter into the vehicle, the member 3 is equipped with a chamber 4 consisting of a rectangular container, one narrow side of which 10 is open at the top. Further the chamber 4 is provided with an opening 9 which is located above the inner space of the heating device 1, through which the fresh heated air is admitted from the heating device 1 into the chamber 4, through which it will pass upwardly by way of the narrow passage 10 into the inside of the vehicle.

I claim:—

1. A device for heating the body of an internal combustion engine driven vehicle which consists of an open top container having a closed jacket spaced from the sides and bottom thereof, an inlet to the jacket and an outlet therefrom for the passage of exhaust gases through the jacket; a closed chamber seated on the jacket and closing the open end of the container, said chamber having a member depending into the container and forming with the side and bottom walls thereof a space; a fresh air inlet to the space, an outlet leading from said space to the chamber and means for leading air from said container to the body of the vehicle, the said chamber being removable from said container to permit its being replaced by a cooking utensil.

2. A device for heating the body of an internal combustion engine driven vehicle which consists of an open top container having a closed jacket spaced from the sides and bottom thereof, an inlet to the jacket and an outlet therefrom for the passage of exhaust gases through the jacket; a closed chamber seated on the jacket and closing the open end of the container, said chamber having a member depending into the container and forming with the side and bottom walls thereof a space; opposed longitudinal ribs on said depending member constructed so as to be in contact with the side walls of the container, whereby air entering the inlet is directed around the bottom of said depending member, a fresh air inlet to the space, an outlet leading from said space to the chamber and means for leading air from said container to the body of the vehicle, the said chamber being removable from said container to permit its being replaced by a cooking utensil.

3. A device for heating the body of an internal combustion engine driven vehicle having an opening in the floor thereof which consists of an open top container having a closed jacket spaced from the sides and bottom thereof, mounted below and in alignment with said opening, an inlet to the jacket and an outlet therefrom for the passage of exhaust gases through the jacket; a closed chamber seated on the jacket and closing the open end of the container, said chamber having a member depending into the container and forming with the side and bottom walls thereof a space; opposed longitudinal ribs on said depending member constructed so as to be in contact with the side walls of the container, whereby air entering the inlet is directed around the bottom of said depending member, a fresh air inlet to the space, an outlet leading from said space to the chamber and means for leading air from said container to the body of the vehicle, the said chamber being removable from said container through said opening to permit its being replaced by a cooking utensil.

GABRIELE DIETRICH.